R. W. KALTENBACH.
BOX CAR UNLOADER.
APPLICATION FILED JAN. 18, 1918.

1,352,608.

Patented Sept. 14, 1920.
6 SHEETS—SHEET 6.

Fig. 9.

Inventor
Robert W. Kaltenbach
By Thurston & Kwis
Attys.

UNITED STATES PATENT OFFICE.

ROBERT W. KALTENBACH, OF CLEVELAND, OHIO, ASSIGNOR TO THE McMYLER INTERSTATE COMPANY, OF CLEVELAND, OHIO, A CORPORATION OF OHIO.

BOX-CAR UNLOADER.

1,352,608.  Specification of Letters Patent.  Patented Sept. 14, 1920.

Application filed January 18, 1918. Serial No. 212,515.

*To all whom it may concern:*

Be it known that I, ROBERT W. KALTENBACH, a citizen of the United States, residing at Cleveland, in the county of Cuyahoga and State of Ohio, have invented a certain new and useful Improvement in Box-Car Unloaders, of which the following is a full, clear, and exact description.

This invention relates to apparatus for removing coal and similar material from the side door openings of box cars when rocked or tilted on a tilting platform or similar device which elevates first one end of a car and then the other, such a platform being shown in U. S. patent to John McMyler, No. 1,253,068, dated January 8, 1918, and entitled Car-tilting apparatus.

It is the principal object of the invention to provide means by which material may be removed from the cars quickly and with minimum breakage.

The above object is attained by the present invention which in one aspect includes a device or mechanism, preferably in the form of a so-called scraper, which is supported on the tilting platform, and is designed to be inserted into the car when the latter is properly positioned on the platform, to move or deliver the material from the car, and preferably directly into one or more chutes which discharge into a receiving hopper.

In another aspect, the invention comprises a tilting platform carrying one or more chutes designed to receive the material which is discharged through one or both side door openings of the car, together with means by which these chutes may be shifted so as to be brought up close to the sides of the car and to be moved away therefrom so as not to interfere with the movements of the car onto and from the platform.

Still further, the invention resides in numerous details of construction and combinations and arrangements of parts of the scraper or delivery mechanism and of the chute shifting mechanism, all carried by the tilting platform, and designed to be rocked therewith when the platform is rocked to elevate successively opposite ends of the car, as will be described in the specification and set forth in the appended claims.

In the accompanying sheets of drawings wherein I have shown the preferred form of my invention, Fig. 5 is a side view of the middle portion of the tilting platform with mechanism for supporting and operating the scraper, receiving chutes and other parts; Fig. $5^a$ is a detached side view of one end of the platform.

Figure 1:
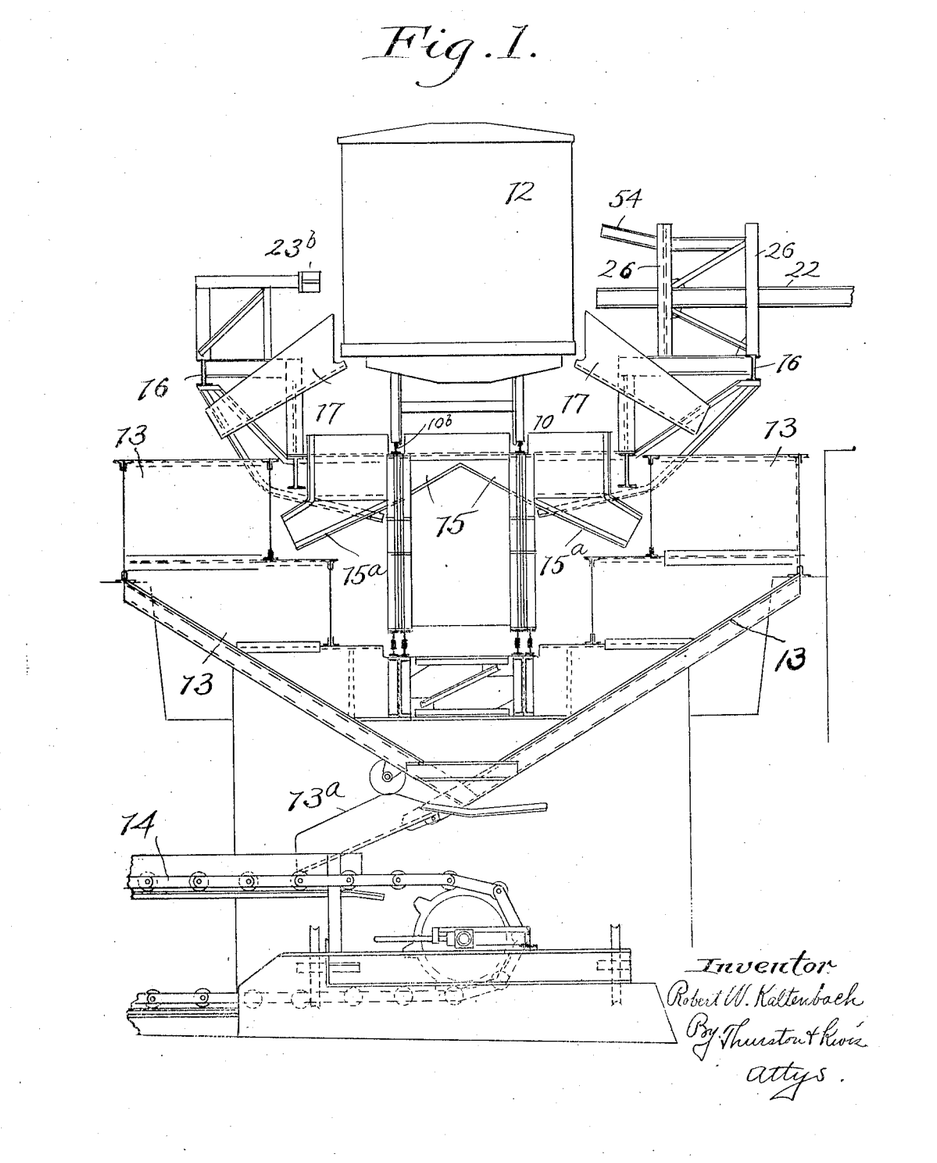
Figure 1 is a view looking toward one end of the platform and showing the receiving hopper and a conveyer for carrying the material away from the hopper, also the chutes which receive the material from the door openings of the box cars and deliver the same into the hopper, also the means for supporting the scraper mechanism, the scraper mechanism itself being omitted.
Figures 5, 5A:
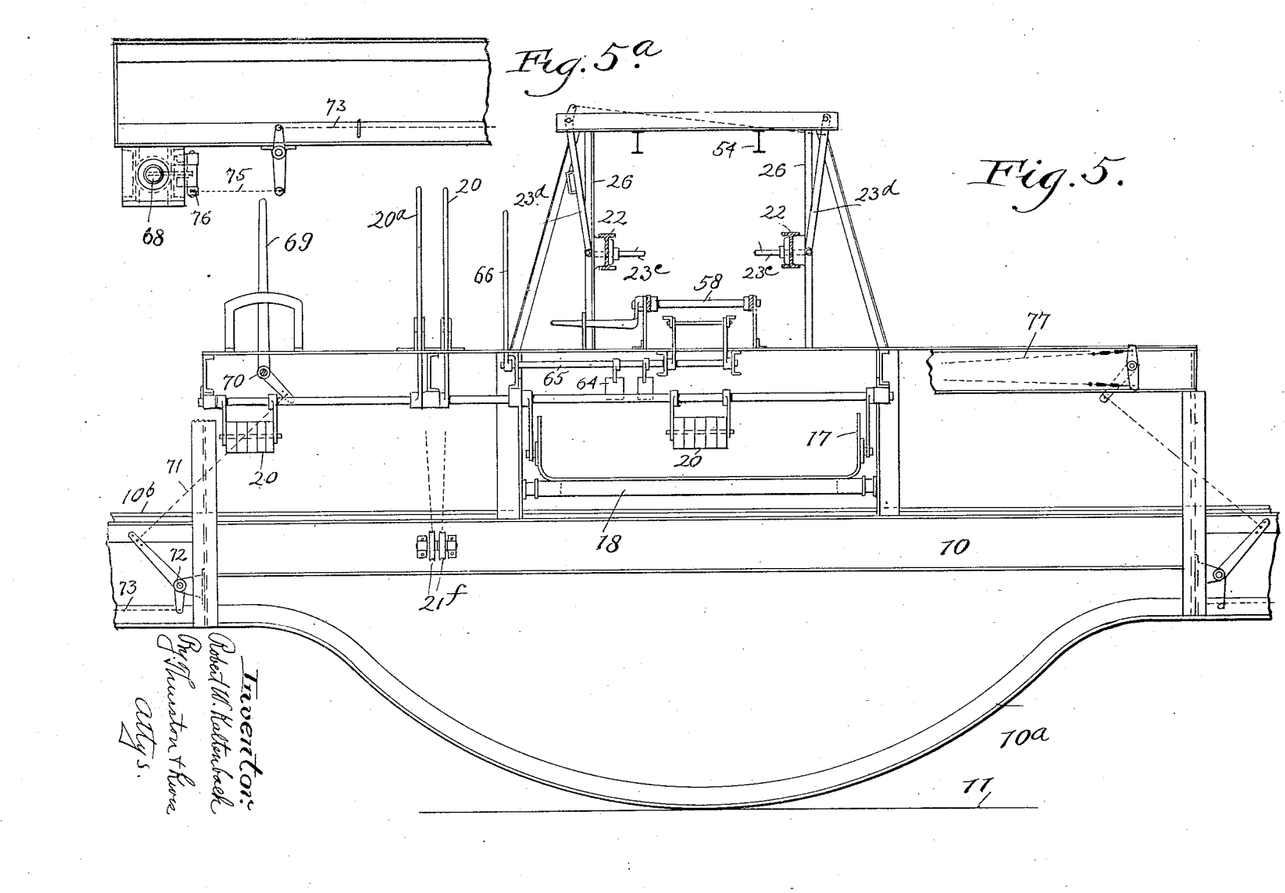

The various parts or features of the present invention are preferably utilized in connection with a box car unloader of a type such as is shown in the McMyler patent above referred to, and involving a tilting platform 10 designed to be rocked or rolled so as to elevate first one end and then the other, preferably by means of a rounded or curved base $10^a$ designed to roll on a flat base shown conventionally at 11 in Fig. 5. The platform 10 is provided with track rails $10^b$ on which are designed to be run cars such as box cars 12 one of which is shown in Fig. 1 in position to have material dumped or removed therefrom.

The material which is discharged from the cars when the platform is tilted in the manner hereinafter described is received into a large hopper 13 which is stationary with respect to the platform. This hopper, as shown in Fig. 1 extends on both sides of the platform, and also beneath the same, the inclined bottom of the hopper terminating into a delivery chute $13^a$ which delivers onto a conveyer or other suitable receiving device 14.

While this apparatus is designed particularly for box cars it may be utilized in handling ordinary bottom dump hopper cars and for that reason the platform is provided with an auxiliary hopper 15 with chutes 15ª which deliver into the main hopper 13.

Referring now particularly to Figs. 1, 2, 5 and 6, it will be seen that the platform 10 is provided on both sides of the track rails 10ᵇ with elevated structures 16 and 16ª. These elevated parts or superstructures which extend substantially the length of the car 12 when on the platform, support the delivery mechanism including the various operating levers and other parts which will be referred to presently, and they also support at least one, but preferably two chutes 17 which are generally somewhat wider than the side door openings of the box car, and project downwardly and outwardly from the latter so as to receive the material discharged through the side door openings of the car and to discharge the same into the main hopper 13. It is one of the features of this invention that these chutes are movably supported so that they can be moved away from the car and up close to the sides of the latter, or close to the side door openings of the car so that while the car is being unloaded, these chutes will be in position to receive the material, but nevertheless by reason of the fact that they can be moved away from the sides of the car they will not interfere with the movement of a car onto or from the platform 10, even though cars of different widths are handled.

Figure 6:
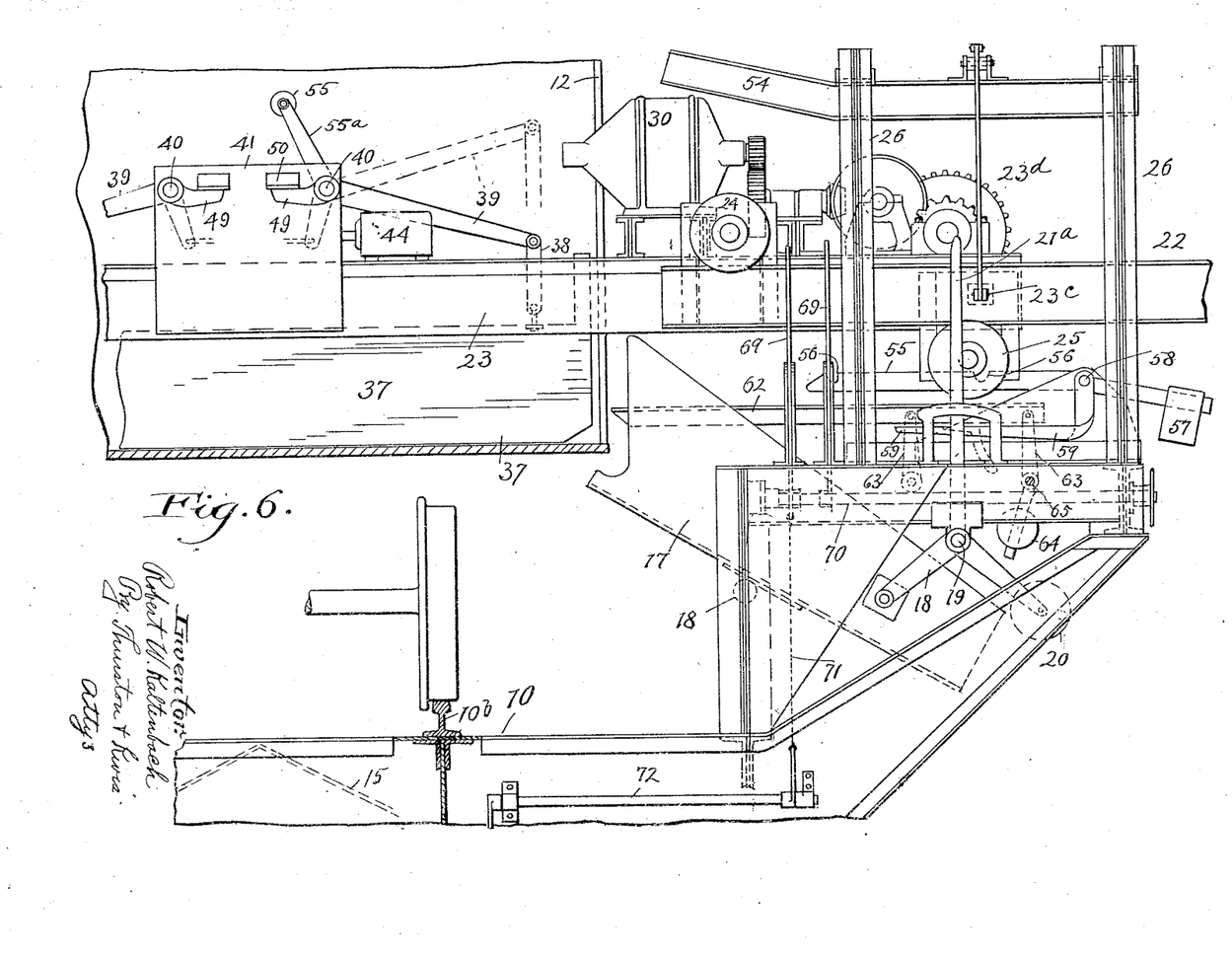
Fig. 6 is a view on an enlarged scale showing the platform in transverse section, also showing a portion of the box car and the scraper when positioned in the car to scrape the material therefrom.

Each chute is supported in part by a roller 18, shown in Figs. 5 and 6, these rollers being supported in the elevated parts 16 and 16ª. Additionally the chutes are partially supported by shifting levers 18 pivotally connected to the two chutes and fixed to two shafts 19 and 19ª which are suitably journaled on the two elevated parts or superstructures, both shafts being preferably counterweighted, the counterweights for the shaft 19 being shown at 20 in Figs. 5 and 6.

Figure 9:
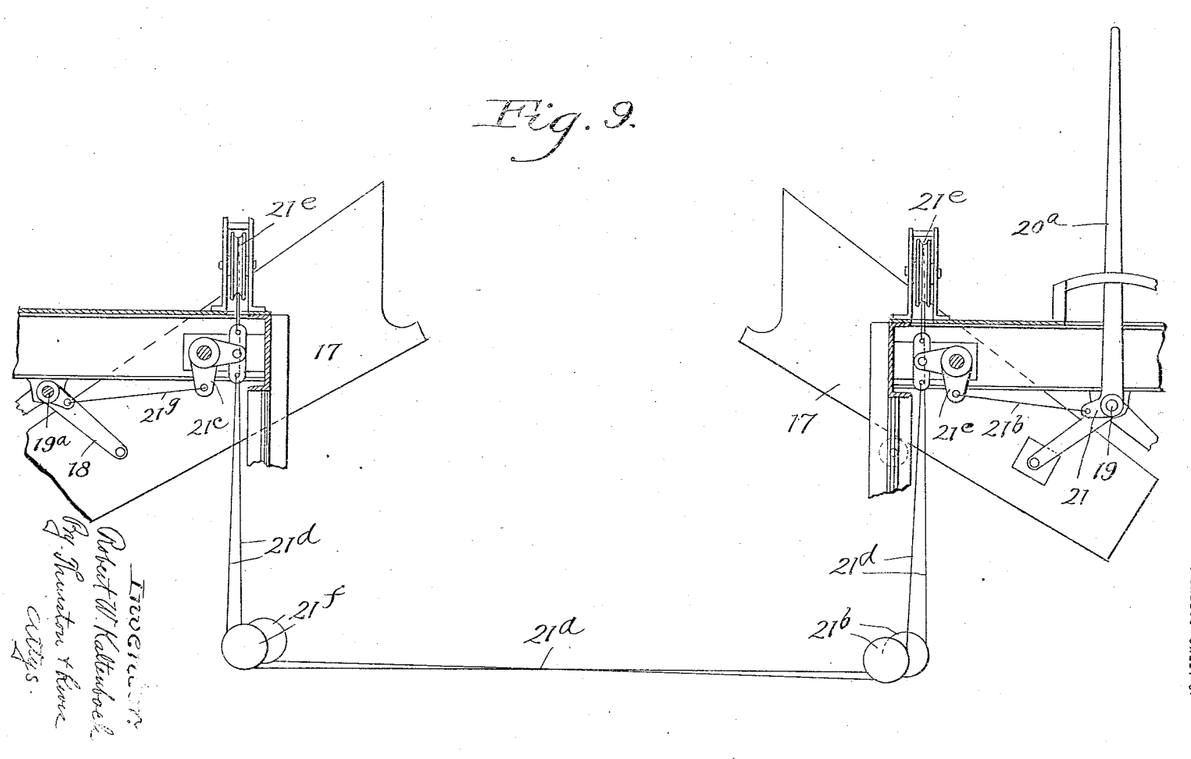
Fig. 9 is a somewhat diagrammatic or distorted view showing part of the chute shifting mechanism.

For the purpose of shifting the two chutes upward toward, or downwardly and outwardly away from the car, two hand levers 20 and 20ª are provided on the elevated part or superstructure 16. One of these hand levers 20 is fixed to the shaft 19, and the other while journaled on the shaft 19, is connected by suitable shifting mechanism to the opposite shaft 19ª which operates the second shaft. Any suitable transmission mechanism may be employed to connect the hand lever 20ª across to the opposite side of the platform so as to operate the shaft 19ª, but in this case the lower end of the hand lever 20ª has an arm 21 projecting therefrom connected by a bar or rod indicated conventionally at 21ᵇ, to a bell-crank 21ᶜ (see Figs. 4 and 9) which is connected to an endless rope 21ᵈ passing over an elevated sheave 21ᵉ, then downwardly to a pair of lower sheaves 21ᶠ, and then across to the opposite side of the platform around a pair of sheaves similar to 21ᶠ, and then around a second elevated sheave 21ᵉ just below which the rope is connected to a second bell-crank, and this bell-crank is connected by a bar or rod 21ᵍ to an arm on the shaft 19ª to be operated. It is to be understood, however, that any other suitable means may be employed to transfer movement from the shifting lever 20ª on the elevated structure 16 to the shaft 19ª which operates the chute carried by the elevated structure 16ª on the opposite side of the platform.

With the chutes mounted as described, and with the shifting mechanism connected to the two chutes, as soon as a loaded car is properly positioned on the platform, the chutes will be swung up to the sides of the car directly opposite the side door openings so as to receive material which is delivered from the car, and after the car is emptied, the chutes will be swung back again so that the empty car can be removed, and a loaded car again brought into position to be unloaded. This chute shifting mechanism becomes necessary for the reason that cars of different widths may be received on the platform and unloaded. Stationary chutes could not be employed advantageously, because if they were positioned for a relatively narrow car, they would naturally interfere with the movements of a relatively wide car, and if positioned to coöperate with a relatively wide car, they would not be properly located to receive material from a relatively narrow car.

In connection with the chutes and the chute shifting mechanism above described, I provide on the platform in position to be moved into and out of the car, mechanism by which the material in the car is positively delivered from the car into the chutes. This delivery mechanism may be of different forms or types, and while I do not desire to be confined to the type herein disclosed, I prefer to employ delivery mechanism having as a part thereof, a movable scraper member which is so supported on the platform that it can be run into the car and shifted back and forth relative to a supporting frame so as to deliver material through the side door openings on its inward and outward strokes. I therefore provide on the elevated structure 16, two beams or tracks 22, which extend transversely inward nearly to the car when the latter is in position to be unloaded. These beams 22 support the scraper mechanism which includes in this case a rectangular frame 23 which is movable along the beams 22 in a direction at right angles to the car, and is of sufficient length that it can be run into the car through one side door opening thereof to or substantially to the other. This scraper frame 23 is movably supported on the beams 22 by two pairs of wheels including a pair of upper wheels 24 which engage the upper faces of the beams and a pair of lower wheels 25 which engage the lower faces of the beams 22, the last mentioned wheels being near the extreme outer end of the frame. It might here be mentioned that these beams or tracks 22 which support the scraper mechanism are in turn supported on a suitable frame which includes upright members 26, shown in Figs. 1, 5 and 6.

Figure 7:
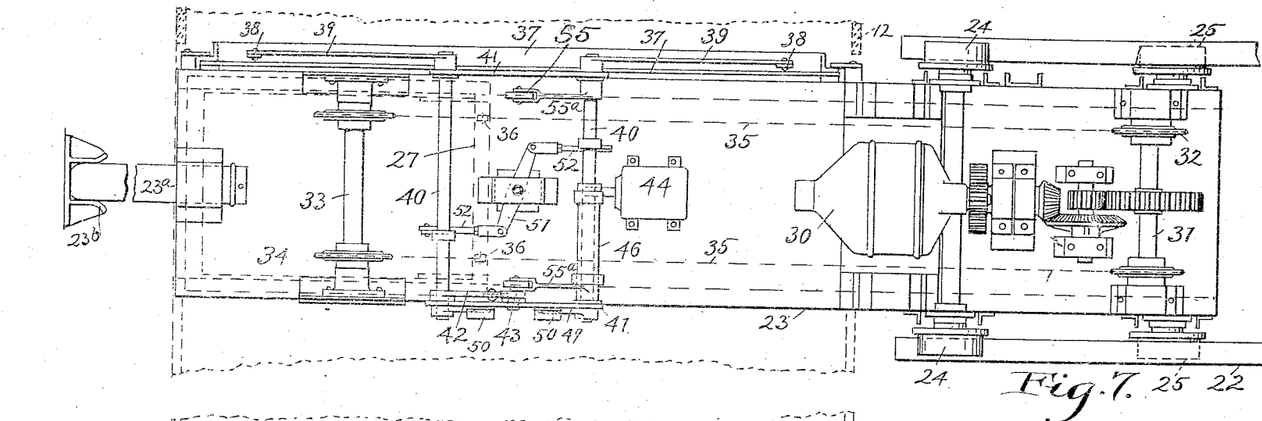
Fig. 7 is a plan view of the scraper mechanism showing a portion of the box car in dotted lines.

This scraper frame 23 has channel-shaped side members constituting guide-ways for a rectangular frame 27 carrying a scraper member in the form of a hoe 28, (see particularly Fig. 8) this hoe being carried by a pair of arms or U-frame pivoted at 29 (see Fig. 8) on the rectangular frame 27 which is designed to travel back and forth lengthwise of the main scraper frame 23. The scraper 28 together with the traveling frame 27, both parts of which will for convenience be termed the scraper, is shifted back and forth so as to scrape the material from the car first through one side door opening and then the other by mechanism including a reversible motor 30 which is connected by a train of gears to a shaft 31, which as best shown in Fig. 7, is near the outer end of the main scraper frame 23. This shaft carries a pair of sprocket wheels 32, while a similar shaft 33 near the opposite end of the scraper frame 23, has sprocket wheels 34 similar to those on shaft 31, and these two sets of sprocket wheels are connected by two endless chains, indicated conventionally at 35, which chains are connected to the scraper frame 27 which travels lengthwise of the main scraper frame 23, the point of connections of the chains 35 with the traveling scraper frame being indicated at 36. Thus through the reversible motor 30, the motor driven shaft 31, and the endless chains 35, the hoe or scraper 28 can be moved back and forth across the floor of the car, pulling the material through the right hand side door opening, as viewed in Fig. 8, when the hoe is being moved to the right, and pushing the material out through the left hand side door opening when the scraper is moved in the opposite direction. The motor can be controlled in any suitable manner, but generally through a hand operated switch which is not shown.

It is to be noted that this scraper mechanism has the important advantage that the scraper proper is self-adjusting to varying heights of the car floors, this being due to the fact that the scraper or hoe is connected to arms hinged to the traveling frame. This is important because with different cars the height of the floor from the top of the track rails may vary as much as six inches.

Figure 8:
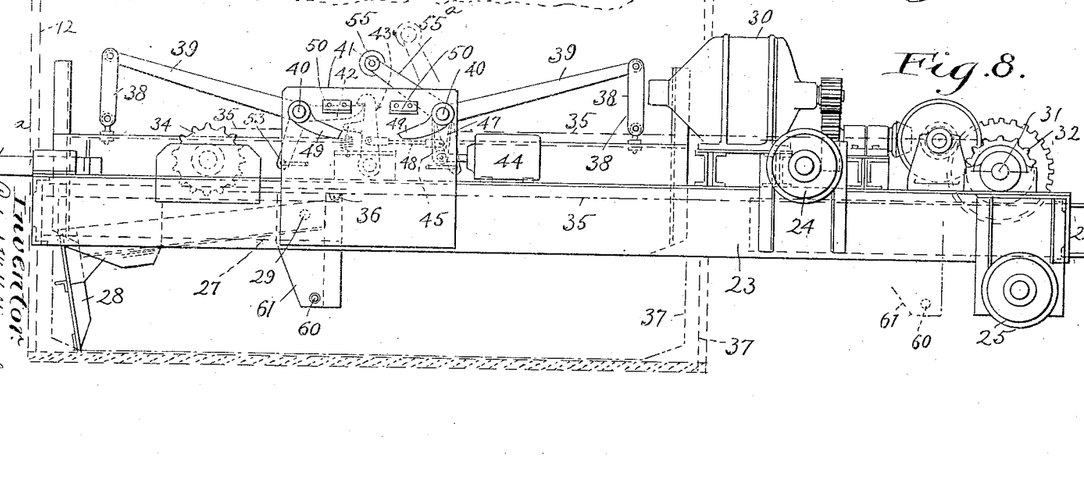
Fig. 8 is a side view of the same.

An additional important element of this scraper is a shield or door 37 which when the scraper frame is inserted in the car as shown in Figs. 7 and 8, extends transversely of the car substantially from one side thereof to the other, the object of this shield being to prevent the flow of material past the scraper when the material in the car has been shifted toward one end as will subsequently appear.

To explain clearly the function of this shield it will be advisable at this point to state or explain how the box car is tilted in order to empty it in the shortest possible time with this scraper mechanism. Just before the car is run onto the tilting platform 10, the side doors are opened, and planking which is usually arranged across the door openings is removed from the car so that a certain quantity of material falls into a suitably provided hopper arranged at what is known as the plank removing station, which is a short distance from the unloader. Then the car is run onto the tilting platform, and after the two side chutes are adjusted, but before the scraper mechanism is inserted in the car, the platform is tilted so as to elevate one end of the car and lower the opposite end. This causes the material to flow toward the lowered end of the car, and in so doing, much of the material flows from the car, there being left in the car approximately, or less than a half car-load, the major portion of which is at the lower half of the car, there being a so-called apex of coal extending up past the door opening, this being due to the fact that not all the coal will flow to the lowered end, some forming this apex as the coal adjusts itself to its natural slope.

The scraper frame is now run into the car, and is properly positioned therein with a plunger 23$^a$ at the forward end of the scraper frame 23, engaging into a positioning guide 23$^b$ which is supported on the elevated structure 16$^a$ directly opposite the adjacent door openings of the car. The scraper frame is then locked in this position by a pair of locking bolts 23$^c$ (see Fig. 5) which are carried by the scraper supporting beams or tracks 22, and are adapted to be inserted through the medium of bolt shifting levers 23$^d$, shown in Fig. 5, and one shown in Fig. 6, in suitable bolt receiving openings near the outer end of the main scraper frame 23.

After the scraper is thus run into and positioned in the car, this apex of coal is removed by the action of the scraper until all the coal is removed from the high end of the car whereupon the shield or door 37 is lowered in the manner hereinafter described, so as to extend down to the car floor as shown in Fig. 6. Then the platform 10 is rocked in the opposite direction, elevating the loaded end of the car and causing the material to flow toward the opposite end, but its flow is intercepted by the now lowered door 37, which acts as a shield or bulkhead. The scraper or hoe is then operated or moved back and forth, pulling the material through one side door opening and shifting it through the opposite side door opening, the material being gradually fed up to the lowered door or shield 37, due to the inclination of the car, it being understood that the car and platform will remain stationary, with the loaded part elevated until the car has been entirely cleared or emptied, whereupon the platform and car will be restored to horizontal position, and the scraper will be shifted out of the car.

Having described the manner in which the scraper is operated, also the way in which the car is tilted, and the functions of the shield, I will next describe certain details of the scraper mechanism which include the means for raising and lowering the shield, and certain features employed to shift the scraper into and out of the car.

Normally the shield is held in elevated position by a pair of links 38 (see particularly Fig. 8) which are attached to the shield near opposite ends, and by a pair of levers 39 which are attached to the links and are mounted upon a pair of rock-shafts 40, suitably journaled in upstanding plates 41 on the scraper frame, one of the rock-shafts having an arm 42 shown by full lines in Fig. 7, and by dotted lines in Fig. 8, which is adapted to engage under a latch 43 near one side of the scraper frame. This latch is held in engagement with the arm 42 by a spring, and is shifted out of engagement with the arm by mechanism including an electric solenoid 44 which is connected to an arm 45 (see Fig. 8) attached to a sleeve 46 on one of the rock-shafts 40, this sleeve having an arm 47 which in turn is connected by a link 48 to the latch.

When the solenoid is energized, the latch is pulled away from the arm 42, whereupon the shield drops by gravity substantially to the bottom of the floor of the car, the downward movement being limited by the engagement of short arms 49 engaging stop abutments 50 on one of the plates 41. The two rock shafts 40 are connected together so as to move in unison by a lever 51 (see Fig. 7) pivoted at its center on the scraper frame between the two rock shafts and connected by links 52 to arms 53 projecting downward from the rock shafts.

The shield remains in lower position until the car has been emptied, and the scraper is removed from the car, but when this is done it is desired that the shield be raised. The shield is automatically elevated when the scraper is being drawn out of the car, by a pair of inclined tracks or guides 54, (see Figs. 1 and 6) which tracks are carried by the uprights 26 on the superstructure or elevated parts 16 of the platform, and when the scraper is being withdrawn, are engaged by rollers 54ª carried by arms 54ᵇ which are secured to one of the rock shafts 40. These inclined guides or tracks 54 depress the rollers 54ª and arms 54ᵇ and rock the shafts 40 until the latch 43 is caused to reëngage or snap over the locking arm 42, whereupon the shield will be held in elevated position until the scraper is again moved into the car and the solenoid 44 operated to cause the release of the shield.

In addition to the parts above described, I have provided means by which the scraper as a whole can be moved into and out of the car by power derived from the motor 30, although the latter is employed primarily for shifting the scraper proper, or hoe. To accomplish this I provide means for temporarily locking or holding the scraper proper against movement so that when the motor 30 is operated the main scraper frame will be moved instead of the scraper proper being moved.

To accomplish this I provide on the superstructure 16 beneath the beams or tracks 22 along which the scraper moves, a pair of inwardly projecting arms 55 having two sets of upwardly facing notches 56, these arms being counterweighted as at 7 to swing upwardly, and mounted on a shaft 58 to which is attached a foot lever 59 to depress the arms 55.

Additionally I provide on the auxiliary scraper frame 27 which directly carries the hoe or scraper proper 28 a transverse shaft 60 (see Fig. 8) which is supported a suitable distance beneath the main scraper frame 23 in a pair of plates 61 which project downward from the auxiliary scraper frame 27. This transverse shaft 60 is of such a size that it will fit into the notches 56 of the arms 55 referred to above.

To remove the scraper from the car the scraper proper including the auxiliary scraper frame 27, the hoe 28, and the transverse shaft 60 is run outward by operating the motor 30 until the shaft 60 engages in the first set of notches 56 of the arms 55, the foot lever 59 being depressed so as to swing the arms 50 downward to allow the transverse shaft 60 to enter the notches. This temporarily locks the scraper proper so that when the motor is again started the scraper frame is moved outwardly from the car while the scraper proper is held stationary. Then after a certain predetermined movement the transverse shaft 60 will be caused to engage in the outer notches 56, whereupon the main scraper frame is moved outwardly a farther distance, which will be sufficient to clear the car. In a similar manner the scraper can be moved into the car through the operation of the motor 30 by temporarily locking the scraper proper through the medium of the transverse shaft 60 and the notched arms 55.

When the scraper as a whole is moved out of the car it is desirable that the hoe 28 or scraper proper be elevated, and for this purpose I provide below the inwardly projecting arms 55 a pair of tracks 62 which are also supported on the superstructure or elevated part 16, and project forwardly nearly to the side of the car, as shown in Fig. 6. These tracks 62 are supported on two sets of parallel arms 63 pivoted at their lower ends and counterweighted so as to normally stand substantially vertical with the tracks elevated by means of counterweights 64. These counterweights and the outermost set of arms 63 are mounted on a shaft 65, (see particularly Fig. 5), to which is attached a hand lever 66 which when operated, will move the tracks 62 forwardly and downwardly, so that when the scraper is being moved out of the car the hoe or scraper proper 28 will ride up on these tracks and when the hand lever and shaft 65 are restored to normal position the hoe will be elevated and will ride off the track 62 onto the floor of the car when the scraper is moved into the car.

Figures 2, 3, 4:
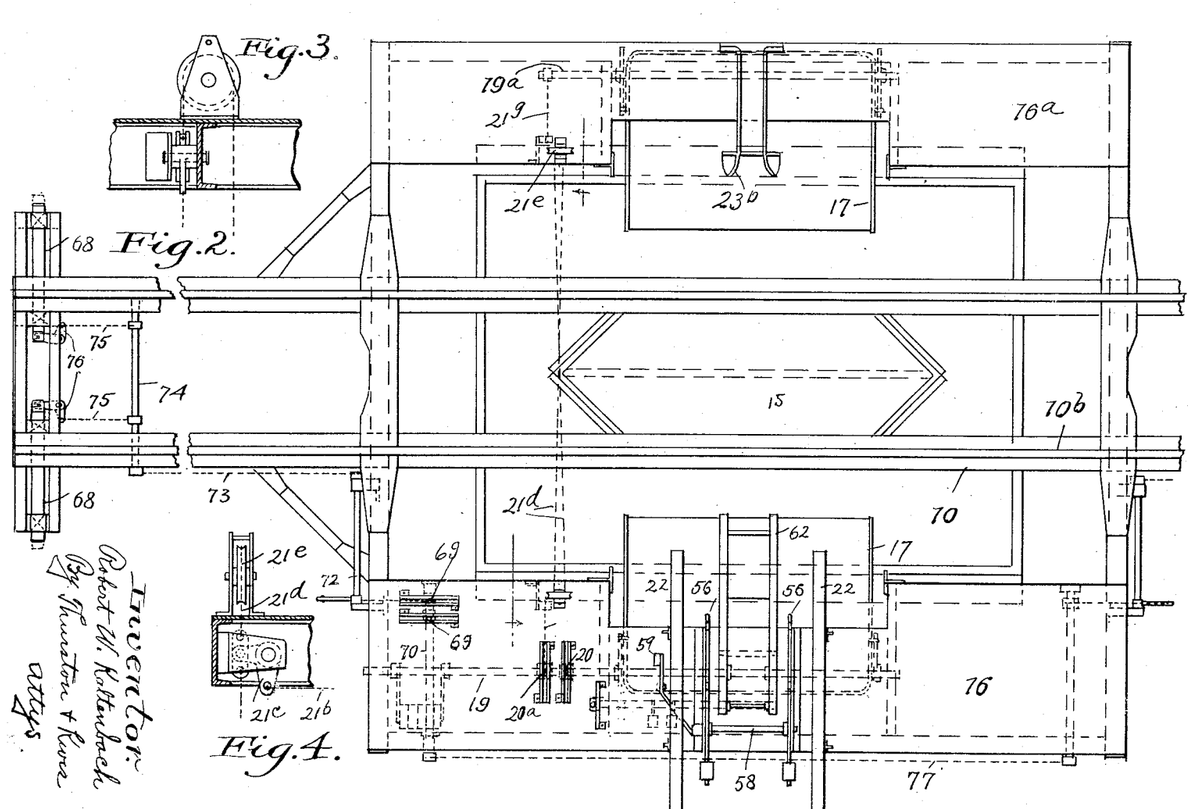
Fig. 2 is a plan view of the same, parts being broken away and omitting the box car, which is shown in Fig. 1.
Figs. 3 and 4 are details of certain parts shown in Fig. 2.

When a car is being run onto or off the tilting platform 10, the latter is held rigidly in a horizontal position by any suitable locking device or devices, such for example, as laterally movable pins 68, shown in Figs. 2 and 5ª, which in this case are designed to be operated by hand levers 69, shown in Figs. 5 and 6. In this case, one of these levers is attached to, and the other is free to turn on a shaft 70. The hand lever which turns freely on the shaft 70 is shown connected by a rod 71 to a rock-shaft 72, shown in Figs. 2 and 6, this rock-shaft through a suitable rod 73 operating a rock-shaft 74 (see Fig. 2) which is connected by rods 75 to bell-cranks 76, connected to the locking pins at one end of the platform. The other hand lever 69, which turns the shaft 70, through suitable rope, lever and rod connections designated as a whole by the reference character 77, operates the locking pins at the other end of the platform.

When the car is properly positioned on the platform, the delivery chutes 17 will be swung up to the side door openings, and then the car will be tilted as previously described, to cause part of the contents of the car to flow from the side door openings, and the remainder to flow to the lowered end of the car. Thereupon the scraper is run into the car, and after being centered by the centering devices 23ª and 23ᵇ, is locked in position by the locking pins 23ᶜ, and the scraper is operated to remove the coal which extends in the form of the apex past the door opening. Then the shield 37 is lowered, and the car is tilted in the opposite direction, causing the material to flow up to the shield 37. Then the scraper is again operated and on each stroke either scrapes or pushes material out of one of the side door openings. The car remains in the position stated until it is entirely emptied, after which the chutes are swung back from the car, and the scraper as a whole is moved out of the car, the shield being elevated while this is being done. The car and platform may be restored to horizontal position either before or after the scraper is run out of the car, and after the latter is accomplished and the car and platform are again in horizontal position, the locking bolts are shot so as to hold the platform in horizontal position, after which the empty car is run off the platform and a loaded car run onto the same, and the operation described above is repeated.

While I have shown only one embodiment of my invention, it will be understood that it may be modified and changed in many respects. For example, it may be desired to employ some other form of device movable in front of the shield to positively move the material from the car, and if a device is employed which moves the material in one direction only, only one chute will be needed. The arrangement herein shown and described is preferred however. I therefore aim in my claims to cover all modifications which do not involve a departure from the spirit and scope of my invention in its broadest aspects.

Having described my invention, what I claim, is:

1. A box car unloader comprising a tilting platform adapted to be rocked so as to elevate first one end of a car and then the other, a receiving member for material discharged from cars run onto the platform, a delivery chute carried by the platform and movable relative thereto to and from the side door opening of a car positioned on the platform, and means supported by the platform and adapted to be run into one side of a box car for positively moving material in the car into the chute.

2. In a box car unloader, a tilting platform adapted to be rocked so as to elevate first one end of a car and then the other, and means carried by the platform and adapted to be inserted in one side of a car for positively moving material therefrom.

3. In a box car unloader, a tilting platform adapted to be rocked so as to tilt a car and means for emptying the car comprising a shield adapted to be extended across the car to stop the material flowing from the elevated end of the car and means movable in front of the shield for removing the material from the car.

4. In a box car unloader, a tilting platform adapted to be rocked about a transverse axis so as to tilt a car and means adapted to be inserted into the car for emptying the same and comprising a shield for stopping the material flowing from the elevated end of the car, and means movable in front of the shield for removing the material from the car.

5. In a box car unloader, a tilting platform adapted to be rocked so as to tilt a car, and means carried by the platform adapted to be inserted into the car from one side thereof, and having a shield for stopping the material flowing from the elevated end of the car, and means movable in front of the shield for removing material from the car.

6. In a box car unloader, a tilting platform adapted to be rocked so as to tilt a car, and means for removing the material from the car, said means comprising a structure movable into the car through one of the door openings thereof, and comprising a shield for checking the flow of material from the elevated end of the car, and mechanism for positively moving the material from the car.

7. A box car unloader comprising a tilting platform adapted to be rocked to elevate one end of a car, mechanism for removing material from the car, said mechanism comprising a device normally supported on one side of the platform and adapted to be run into the car from one side thereof, and means on the opposite side of the platform for centering the device in the car.

8. A box car unloader comprising a tilting platform having tracks for cars to be unloaded and adapted to be rocked to elevate first one end of a car and then the other, tracks carried by one side of the platform at right angles to the first-named tracks, and mechanism for removing material from the car, said mechanism being supported on said last mentioned tracks and adapted to be moved along the same into the car when the latter is properly positioned on the platform.

9. A box car unloader comprising a tilting platform adapted to be rocked to elevate first one end of a car and then the other, tracks at right angles to the longitudinal axis of the platform, and mechanism for removing material from the car, said mechanism being supported on said tracks and adapted to be moved along the same into the car when the latter is properly positioned on the platform, said mechanism comprising a frame and a scraper movable lengthwise thereof.

10. A box car unloader comprising a tilting platform adapted to be rocked to elevate first one end of a car and then the other, tracks at right angles to the longitudinal axis of the platform, and mechanism for removing material from the car, said mechanism being supported on said tracks and adapted to be moved along the same into the car when the latter is properly positioned on the platform, said mechanism comprising a frame having a shield adapted to be raised and lowered so as to check the material flowing from the elevated end of the car, and a scraper movable along the frame back and forth in front of the shield.

11. A box car unloader comprising a tilting platform adapted to be rocked to elevate first one end of a car and then the other, tracks at right angles to the longitudinal axis of the platform, and mechanism for removing material from the car, said mechanism being supported on said tracks and adapted to be moved along the same into the car when properly positioned on the platform, said mechanism comprising a frame and a scraper movable lengthwise thereof, said frame having power operated means for shifting the scraper.

12. A box car unloader comprising a tilting platform adapted to be rocked to elevate first one end of a car and then the other, tracks at right angles to the longitudinal axis of the platform, and mechanism for removing material from the car, said mechanism being supported on said tracks and adapted to be moved along the same into the car when properly positioned on the platform, said mechanism comprising a frame having a shield adapted to be raised and lowered so as to check the material flowing from the elevated end of the car, a device movable along the frame in front of the shield to move material out of the car, and means for raising and lowering the shield.

13. A box car unloader comprising a tilting platform adapted to be rocked to elevate first one end of a car and then the other, tracks carried by one side of the platform at right angles to the longitudinal axis of the platform, and mechanism for removing material from the car, said mechanism being supported on said tracks and adapted to be moved along the same into the car when properly positioned on the platform, said mechanism comprising a frame having a shield adapted to be raised and lowered so as to check the material flowing from the elevated end of the car, means for moving material out of the car from in front of the shield, and means supported by the platform on the outside of the car for engaging a part connected with the shield for elevating the shield.

14. A box car unloader comprising a tilting platform adapted to be rocked to elevate first one end of a car and then the other, mechanism for removing material from the car comprising tracks supported on one side of the platform, scraper mechanism movable along the track into the car and comprising a frame, a scraper member movable lengthwise thereof, power operated means carried by the frame for shifting the scraper relative to the frame, and means for temporarily locking the scraper against movement whereby said power operated means may cause the frame to be moved into and out of the car.

15. A box car unloader comprising a tilting platform adapted to be rocked to elevate first one end of a car and then the other, mechanism for removing material from the car and adapted to be run into the car from one side thereof, said mechanism including a scraper supporting structure and a scraper movable back and forth along said structure, said scraper being mounted on the structure so as to be self-adjusting to varying heights of car floors.

16. A box car unloader comprising a tilting platform adapted to be rocked to elevate first one end of a car and then the other, mechanism for removing material from the car comprising a structure supported on the platform and adapted to be run into the car from one side thereof, said structure comprising a frame and a scraper member movable back and forth relative thereto, said scraper member including a hoe or scraper proper which is pivotally supported on the frame so that the scraper member may automatically adjust itself to varying heights of car floors.

In testimony whereof, I hereunto affix my signature.

ROBERT W. KALTENBACH